(Model.)
J. L. STRAIT.
PIPE TONGS.
No. 290,810. Patented Dec. 25, 1883.
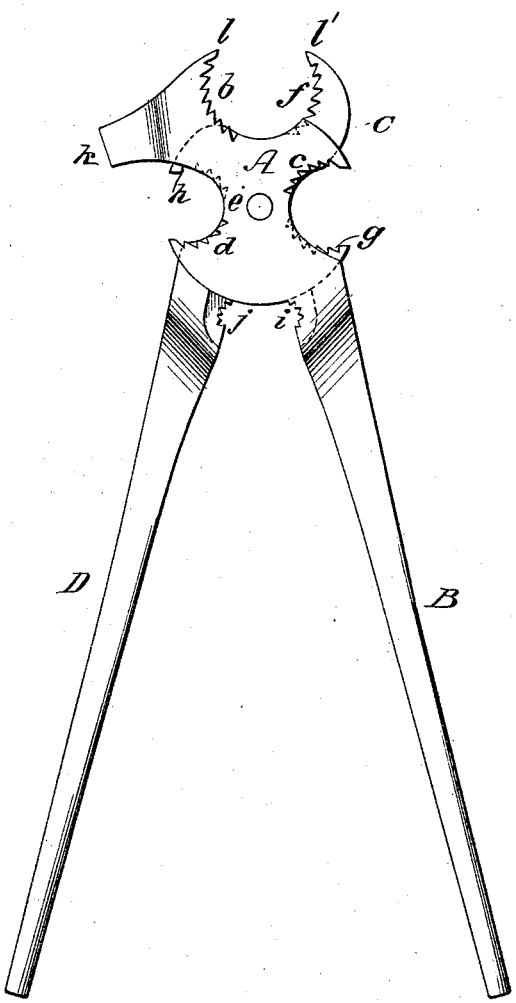
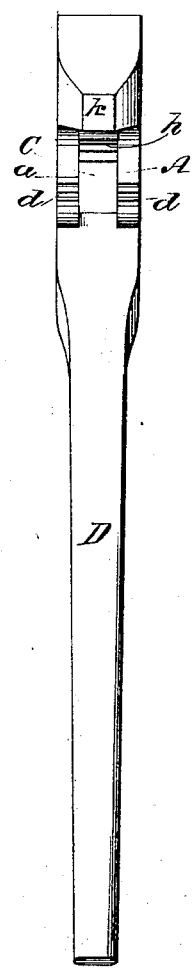
WITNESSES:
INVENTOR:
BY
ATTORNEYS.

UNITED STATES PATENT OFFICE.

JAMES L. STRAIT, OF THOMAS, MISSOURI.

PIPE-TONGS.

SPECIFICATION forming part of Letters Patent No. 290,810, dated December 25, 1883.

Application filed October 17, 1883. (Model.)

*To all whom it may concern:*

Be it known that I, JAMES L. STRAIT, of Thomas, in the county of Harrison and State of Missouri, have invented a new and useful Improvement in Pipe-Tongs, of which the following is a full, clear, and exact description.

This invention seeks to provide pipe-tongs adapted to grasping pipes of various sizes without adjustment, and also tongs that are adapted to be used as nippers and as a hammer; and the invention consists in the special construction of the tongs, all as hereinafter described and claimed.

Reference is to be had to the accompanying drawings, forming part of this specification, in which similar letters of reference indicate corresponding parts in both the figures.

Figure 1 is a side elevation of my new and improved pipe-tongs, and Fig. 2 is an edge view of the same.

A represents the main head of the tongs. This is made hollow, or with the passage $a$ through it, as shown in Fig. 2, and it is made integral with the handle B, and is curved out to form the jaws $b$, $c$, and $d$, the grasping-surfaces of which are serrated to form teeth, as shown, and the head A is also formed with the hammer-head $k$ and with the cutting-edge $l$. In the passage $a$ of the head A is cross-pivoted upon the pin $e$ the head C, which is made integral with the handle D, and is curved out to form the jaws $f$, $g$, and $h$, which correspond, respectively, with the jaws $b$, $c$, and $d$ of the head A, and the said jaws $f$ $g$ $h$ are also serrated to form teeth upon their grasping-surfaces. Below the heads A C the handles B D are correspondingly curved out to form jaws $i j$, the grasping-surfaces of which are also serrated, as shown in Fig. 1, and the head C is formed with the cutting-edge $l'$, which coincides with the cutting-edge $l$ of the jaw $b$ of head A, and in connection therewith constitutes the nippers of the tool. The jaws $b f$ are larger than the jaws $c g$, and these latter are larger than the jaws $h d$, and the jaws $h d$ are larger than the jaws $i j$, so that the tool is adapted for grasping four different sizes of pipes or rods, and this without any adjustment of the tool, which makes it very convenient and adapted for quick and easy use. Besides these advantages, the tool is made cheap and strong, and, being provided with hammer-head $k$ and cutting-edges $l$ $l'$, it is adapted for various other uses besides that of holding pipes, or rods, or bolts.

Having thus described my invention, what I claim as new, and desire to secure by Letters Patent, is—

1. In pipe-tongs, the combination of the heads provided with handles, one head having a passage through it, and having opposite toothed concaved jaws arranged back to back, and the other head pivoted within the passage of the former head, and having similarly-arranged corresponding toothed jaws, that act conjointly to grasp a pipe or pipes, or other cylindric surface, substantially as and for the purpose set forth.

2. In pipe-tongs, the combination of the heads provided with handles, one head having a passage through it, and having opposite serrated or toothed concaved jaws arranged back to back, and a third similar toothed jaw disposed above, but facing in an opposite direction to that in which the jaw on the same side of said head faces, and the other head pivoted within the passage of the former head, and having similarly-arranged corresponding toothed jaws, and a third similar jaw facing the opposite jaw of the said former head, substantially as and for the purpose set forth.

3. In pipe-tongs, the combination of the heads provided with handles and cross-pivoted together, said heads each having opposite toothed concaved jaws arranged back to back, and having a third similar jaw disposed above and facing in an opposite direction to that in which the jaw on the same side of the head faces, each of said heads also having a cutting-edge, and one having a hammer-head, their handles being also provided with jaws, substantially as and for the purpose set forth.

JAMES L. STRAIT.

Witnesses:
WM. A. TEMPLEMAN,
ROBT. D. KING.